United States Patent
Gouverneur

(10) Patent No.: US 10,579,712 B1
(45) Date of Patent: Mar. 3, 2020

(54) SCRIPT-DRIVEN DATA EXTRACTION USING A BROWSER

(71) Applicant: Travelport International Operations Limited, Langley, Berkshire (GB)

(72) Inventor: Yann Gouverneur, Strasbourg (FR)

(73) Assignee: TRAVELPORT INTERNATIONAL OPERATIONS LIMITED, Langley, Berkshire (GB)

(*) Notice: Subject to any disclaimer, the term of this patent is extended or adjusted under 35 U.S.C. 154(b) by 359 days.

(21) Appl. No.: 13/646,200

(22) Filed: Oct. 5, 2012

Related U.S. Application Data

(60) Provisional application No. 61/545,011, filed on Oct. 7, 2011.

(51) Int. Cl.
G06F 17/22 (2006.01)

(52) U.S. Cl.
CPC .................. G06F 17/2247 (2013.01)

(58) Field of Classification Search
CPC ........... G06F 17/2247; G06F 17/30864; G06F 17/30923; G06F 17/30926; G06F 17/30929; G06F 17/30935; G06F 17/30938; G06F 17/30932; G06F 17/30941
See application file for complete search history.

(56) References Cited

U.S. PATENT DOCUMENTS

| | | | | |
|---|---|---|---|---|
| 8,042,063 B1* | 10/2011 | Lin-Hendel | ........... | G06F 3/0482 715/805 |
| 2006/0005122 A1* | 1/2006 | Lemoine | ........ | 715/513 |
| 2006/0136589 A1* | 6/2006 | Konig | ........ | G06F 17/30867 709/224 |
| 2006/0190561 A1* | 8/2006 | Conboy et al. | ........ | 709/217 |
| 2007/0240034 A1* | 10/2007 | Sthanikam | ........ | G06F 17/2211 715/234 |
| 2008/0016087 A1* | 1/2008 | Zhang | ........ | G06F 17/30864 |
| 2008/0235567 A1* | 9/2008 | Raj | ........ | G06F 17/243 715/226 |
| 2008/0307299 A1* | 12/2008 | Marchant et al. | ........ | 715/234 |
| 2009/0070413 A1* | 3/2009 | Priyadarshan et al. | ........ | 709/203 |
| 2009/0125800 A1* | 5/2009 | Chen et al. | ........ | 715/234 |
| 2009/0150412 A1* | 6/2009 | Idicula | ........ | G06F 17/2247 |
| 2009/0204610 A1* | 8/2009 | Hellstrom | ........ | G06F 17/30 |
| 2009/0287641 A1* | 11/2009 | Rahm | ........ | G06F 17/30864 |
| 2010/0077352 A1* | 3/2010 | Heer | ........ | G06T 11/206 715/821 |
| 2010/0088676 A1* | 4/2010 | Yuan | ........ | G06F 17/30908 717/120 |
| 2012/0102019 A1* | 4/2012 | Yoon | ........ | G06F 17/30864 707/709 |
| 2012/0303606 A1* | 11/2012 | Cai | ........ | G06F 17/30705 707/709 |
| 2012/0323881 A1* | 12/2012 | Liu | ........ | G06F 17/30864 707/709 |

* cited by examiner

Primary Examiner — Howard Cortes
(74) Attorney, Agent, or Firm — K&L Gates LLP

(57) ABSTRACT

Various example embodiments are directed to a script-driven browsing application for automatically interacting with remote servers. Retrieval of data by virtue of a script-driven browsing application may be facilitated by pairing a script or scripts with a suitable browser, and employing XPath expressions operating on a DOM representation of one or more web pages such that the script-driven browsing application can iterate efficiently and comprehensively over the web pages.

2 Claims, 11 Drawing Sheets

SCRIPT-DRIVEN DATA EXTRACTION USING A BROWSER

BACKGROUND

The Internet enables accessing information dispersed in multiple remote computer memories in an unprecedented manner. But mere access via a web browser is only the first step. Especially where the remote server or servers store massive amounts of ever-changing data in memory, and where one desires to connect with multiple remote servers, conventional approaches are significantly challenged. By way of non-limiting example, if one wishes to implement functionality so that users can retrieve and compare data from multiple websites, then traditional client-server communication techniques carried out via a browser face issues of scale, complexity and inefficiency.

DESCRIPTION

Example embodiments of a script-driven browsing application are provided herein for automatically interacting with remote servers. In one example embodiment, data retrieval is facilitated by pairing a script or scripts with a suitable browser, and utilizing XPath expressions operating on a DOM representation of one or more web pages such that the script-driven browsing application can iterate efficiently and comprehensively over the web pages. Various example embodiments of operations, such as loops, may be provided herein to facilitate efficient, systematic and comprehensive data extraction.

Figure 1A:
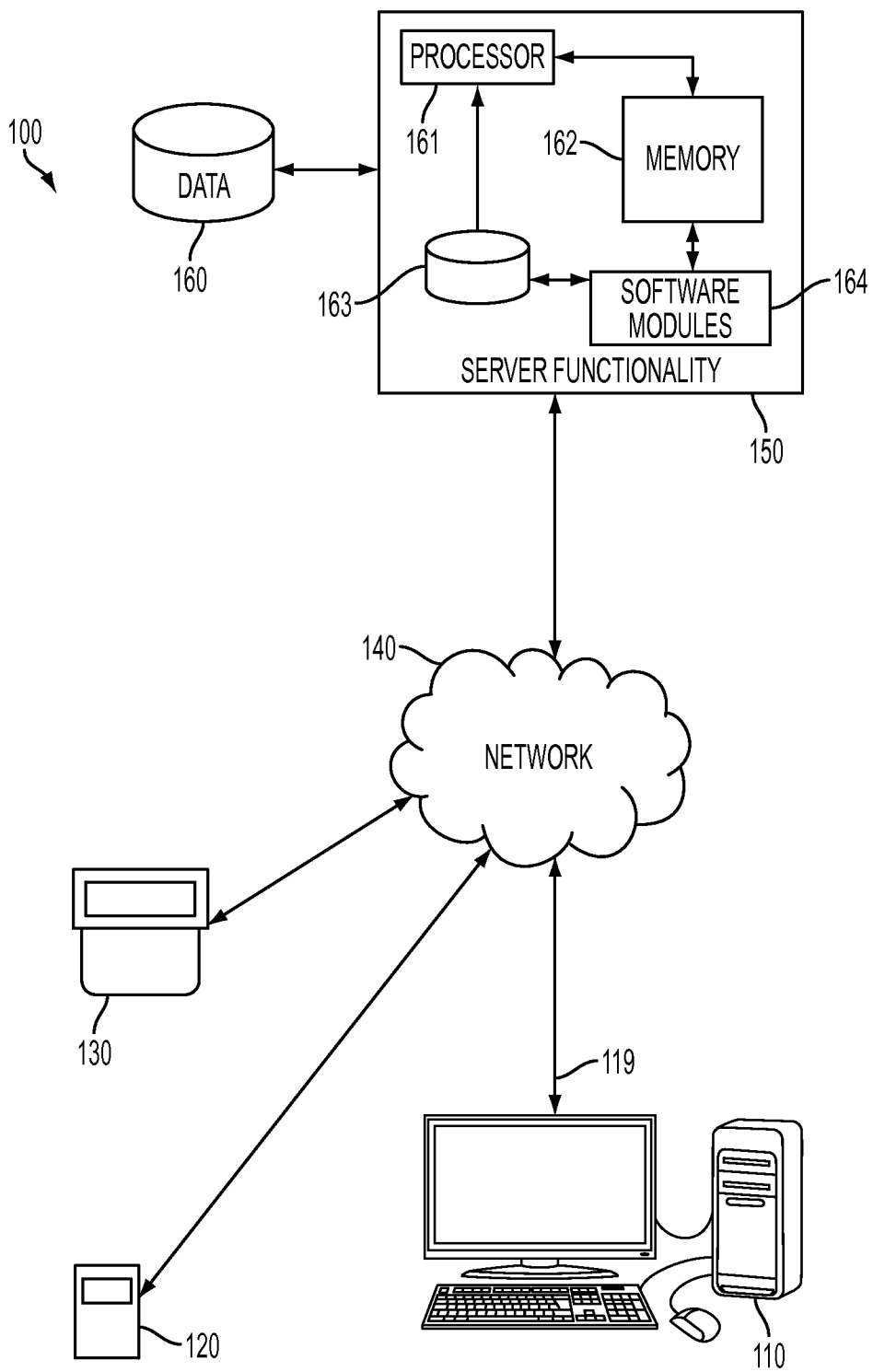
FIG. 1A is a diagram of a computer system according to various embodiments.

FIG. 1A is an example embodiment of a system for providing script-driven extraction of data using a browser. It will be recognized that one of skill may employ multiple architectures, components and interconnections with which to carry out embodiments of the present invention.

Figure 1B:
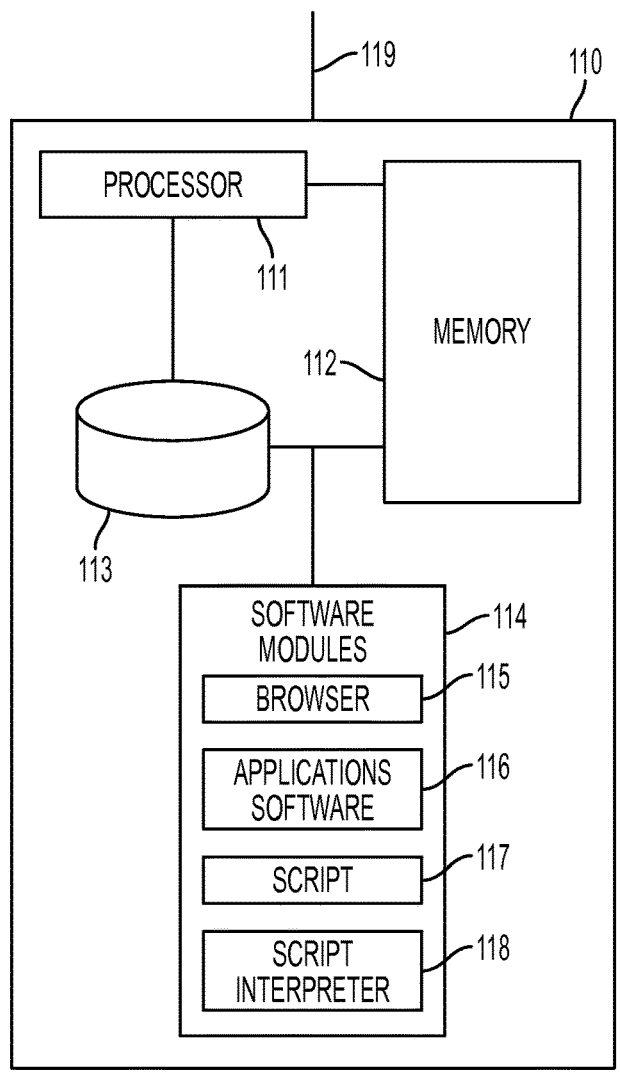
FIG. 1B is a diagram of a client computer or workstation according to various embodiments.

The system 100 may comprise, as shown in FIG. 1A, client hardware capable of executing instructions and storing the result. By way of non-limiting example, such hardware may include a computer or workstation 110 (in communication with a display, keyboard and/or mouse), a mobile device 120 capable of data processing and transmission, laptop computer 130, or any other processing-capable device in communication with a processor. It is understood that each of computer or workstation 110, mobile device 120 and laptop computer 130 may have a processor, memory, software or firmware, and input/output capabilities. FIG. 1B is an example block diagram representing personal computer or workstation 110, comprising a processor 111, memory 112, database functionality 113, software modules 114, and at least one connectivity functionality 119 for communication with a network 140. It is appreciated that each of mobile device 120 and laptop 130 has similar functionalities.

In an example embodiment, computer or workstation 110, mobile device 120, and/or laptop 130 may be in communication with an electronic communications network 140. The electronic communications network 140 may comprise a number of computer and/or data networks, including the Internet, Local Area Networks (LANs), Wide Area Networks (WANs), General Packet Radio Service (GPRS networks, etc., and may comprise wired and/or wireless communication links.

In an example embodiment, there is provided a server 150 that can store data in memory 162 or internal database 163 or both, or in external database 160. Server 150 also comprises a processor 161. Server 150 also comprises software modules 164, which can be seen in more detail in FIG. 1C. Server 150 may comprise one or more servers for a website.

It will be appreciated that the precise architecture and configuration of the foregoing, including but not limited to processors, memories, and software modules, may be implemented in various ways. For example, all or many could reside in or in proximity to relevant subsystems, such as computer or workstation 110 or server 150. Or, all or many could interact remotely, one with the other, as with cloud computing.

Figure 1C:
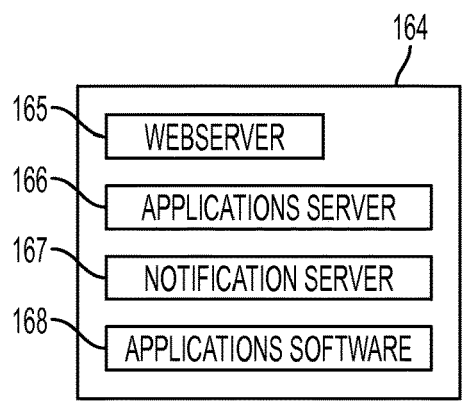
FIG. 1C is a diagram of software modules at a client device according to various embodiments.

In addition, as seen in FIG. 1C, server 150 can comprise multiple software modules comprising a web server 165, applications server 166, notification server 167, or added applications software 168 of many kinds.

The foregoing may be adjacent to each other, in proximity to each other, or remote from each other, so long as the underlying functionality is effectuated.

We turn now to operations of and communications between client devices 110, 120, 130 and server 150.

To communicate with and obtain data from a website such as server 150, and other servers like it on electronic communications network 140, a client such as computer or workstation 110 may use browser functionality for establishing connectivity. Thus, a user or automated client at a client device 110 accesses server 150 via a browser 115.

In this model, the browser 115 acts as with client functionality and facilitates two-way communication with the server 150. Common browsers include the Mozilla Firefox, Microsoft Explorer, and Google Chrome web browsers.

In light of the enormous amounts of data available via the web, for certain applications it is helpful to engage in systematic data extraction to assist in obtaining information and organizing the results. One such application is extracting data from commerce websites that enable functions such as shopping.

Certain software modules 114, when interoperating and embedded within an application, can accomplish the desired functionality. By means of a script 117, as processed via script interpreter 118, applications software 116 can launch a browser 115 that interacts with a desired website(s) and, in so doing, extract the data. In other words, an application may be programmed to reproduce the desired navigation results, and to identify the information elements (e.g., name, price, code) that need to be retrieved in order to extract them. To accomplish the above, the script-driven browsing application can be programmed to specify the set of desired actions.

To understand how such specification may be done, some background into the organization of web artifacts, documents and objects may be useful.

HTML is a markup language used to manage and format data that is ultimately rendered on a Web page. HTML, or HyperText Markup Language, is a convention for displaying data. XML, or Extensible Markup Language, defines structured documents and can be manipulated by generic tools. It also has features for organizing data. Both HTML and XML carry out their functions via tags. HTML tags are preceded by a < symbol, and succeeded by a > symbol. HTML tags include <table>, which defines a table, <col>, which defines a column, and <a>, which defines an anchor. An anchor is used to create a link to another document (with the href attribute indicating the link's destination). Unlike HTML tags, which are predefined, XML tags may be created by the author. However, some XML tags may follow from their use: i.e., <price>, <color>, <title>, etc.

Formatted by tags as described above, a set of HTML- or XML-formatted data can be graphically represented by a tree structure.

The Document Object Model (DOM) is one way to represent such data in a tree structure.

It may be possible to represent such data in an alternate structure or way, i.e., besides the DOM, where operations can be performed on the data by traversing such data in an ordered manner. Thus other schemes may be appropriate as well.

An element is the DOM representation of an XML or HTML tag with any child elements attached to it, its attribute nodes as well as text nodes. By extension, an element is also a node, which is the base item of a DOM tree. A node can contain a value. A node can also contain an action or other condition. A node may have one or more child nodes, which by convention are located below the node on the tree. A node may have at most one parent node. Continuing with the tree analogy, information can be stored in a leaf (though information may be stored in another type of node).

Figure 2:
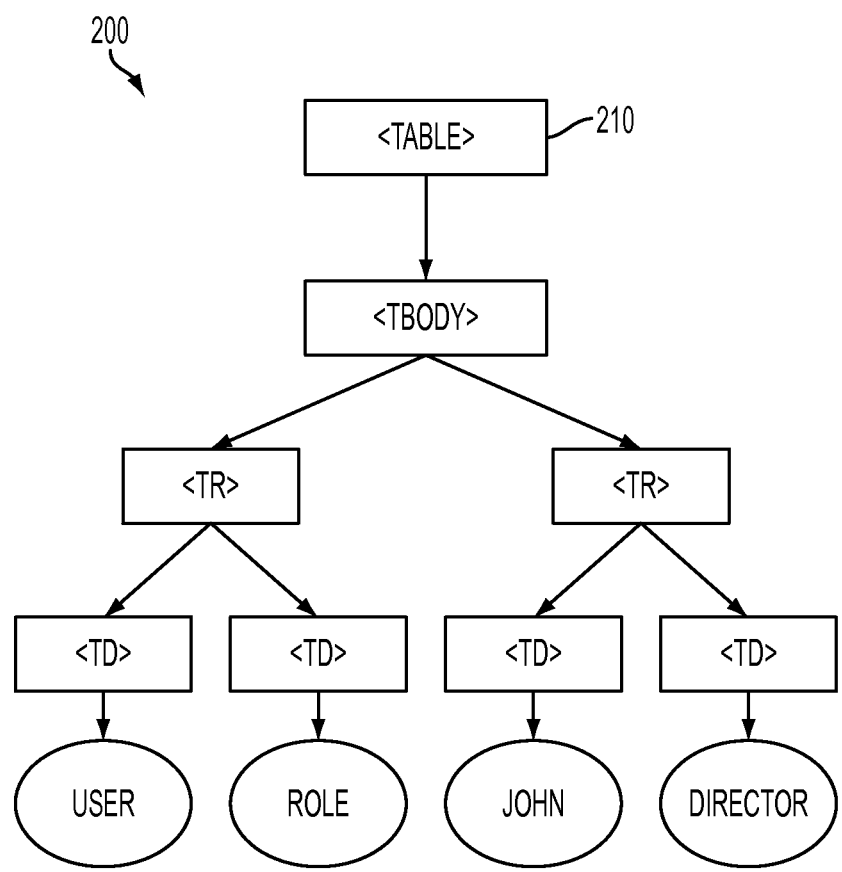
FIG. 2 is a rendering of a Document Object Model representation of a simple table.

Accordingly, HTML and XML tags can be "mapped" into a tree structure. An example follows. Consider the following document fragment illustrated in FIG. 2, comprising a simple table 200.

```
<table>
  <tbody>
    <tr>
      <td>User</td>
      <td>Role</td>
    </tr>
    <tr>
      <td>John</td>
      <td>Director</td>
    </tr>
  </tbody>
</table>
```

The preceding HTML code will be rendered similar to the following:

User Role
John Director

Still further, a DOM tree can be made based on the foregoing. The DOM tree of <table> 210 can be seen in FIG. 2. Accordingly, the elements are mapped into a tree structure.

Using a DOM enhances efficient information extraction because, among other things, one can isolate, navigate and access a desired set of DOM nodes through XPath expressions.

XPath, or XML Path Language, is a convention that enables operations on the hierarchical structure of an XML-containing document. An XML document represented via the DOM is suitable for running XPath operations.

XPath is implemented in web browsers and provides a way to define expressions allowing script commands to act on DOM elements.

XPath evaluates expressions and produces an object that is either a node-set (unordered, non-duplicate nodes), a Boolean (true or false), number, or string.

It will be understood that additional modalities besides XPath may be used to the extent that they can traverse or navigate a structured data representation such as but not limited to a tree structure. For example, related modalities are XSLT and XQuery.

The specified sequence of actions to be taken by the script-driven browsing application can be considered a scenario and may be defined and executed with the aid of an embedded scripting language.

Embedding of a scripting language consists of using its libraries in an application so as to provide the capability to make an application pass a script (written in the embedded language) to an embedded language interpreter (that is instantiated within the instance of the application).

By way of non-limiting example, in an example embodiment one may embed the Lua programming language into the script-driven browsing application. Embedding a scripting language may allow running directly a script written in the given language from the application. For example, then, where the name of the Lua script is pre-defined in a script-driven browsing application source code, one may take it as an application argument to allow running different scripts within the same application.

An efficient high-level script language for such auto-browsing in this manner should preferably accommodate:
 high-level commands (such as those performed by a user). Such commands include loading a page, following a link, clicking a button, or assigning a value to an input field.
 content-retrieval commands. These allow retrieval of parts of the information present on a page document.
 structural elements such as loops, conditionals, and sub-functions.
 browser configuration commands, such as loading preferences, or always trusting https sites even in the event of a self-signed certificate
 configuration commands, such as crawl maximal duration, or inactivity timeout (when requesting a website)

Suitable script languages, other than Lua, for facilitating autobrowsing include the JavaScript, Perl, Ruby, and Python programming languages, and the like, or a proprietarily developed language.

Besides embedding a script language, one may also embed browser functionalities in the application. This may consist of using/linking browser components/libraries so they are available to build a browser and use its functionalities within an application.

One has an application, then, which can load a script in the name specified, for example from the command line, and provide browsing capabilities through its extension in combination with browser components, allowing piloting browser functionalities, like load, click, etc. One may also bind the script interpreter to browser components in order for it to receive notifications of document loading (such as but not limited to start and end).

In a non-limiting example embodiment, the Mozilla Firefox browser may be used as part of the script-driven browsing application to access and operate upon a set of nodes through XPath expressions. Further, one of skill will appreciate that add-ons to the Mozilla Firefox browser can enhance the user of XPath expressions. One such add-on is the Firebug web development tool with the addition of FireXPath, which after downloading is integrated with the Mozilla Firefox browser and enables editing, debugging, and manipulation of the DOM via XPath.

Figure 3A:
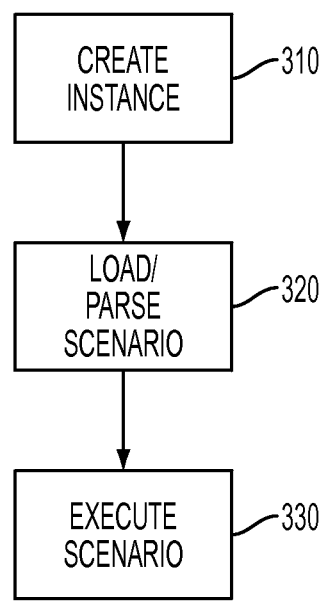
FIG. 3A is a flowchart illustrating carrying out an example scenario according to various embodiments.

An example application in accord with the foregoing may, as seen in FIG. 3A, during its initialization phase, create a script interpreter instance 310. It may permit loading and allowing a script interpreter to parse script 320. It may also permit an interpreter to run a script 330.

In terms of the script 117 used, the first line of a scenario may constitute a header indicating the current version number of the script-driven browsing application. The scenario may comprise blocks that can be called (i.e., called like functions except it is possible, though not required, that no arguments will be passed). Even where no arguments are passed when calling a block, the current context node may be passed implicitly. As far as XPath is concerned, the current context node may be considered the "you are here" node that acts as a point of reference for navigating the DOM.

A main block may be declared inasmuch as it gives the entry point for the scenario. It may be the last block in the file, depending on the entry point of the scenario.

Regarding syntax, the syntax used to declare a block may comprise the following:
<block identifier>
  <block body (commands)>
  done A block is typically closed with the "done" command.

To call a block, one may use the "call" command. An example showing the use of the "call" command, a block, and the main block follows:
[Autobrowse v.1.0]
:config
<configuration commands>
Done
:main
call config
<actions>
done In an example scenario, suppose one wishes to obtain information about round-trip flight options from Washington, D.C., to London.

Figure 3B:
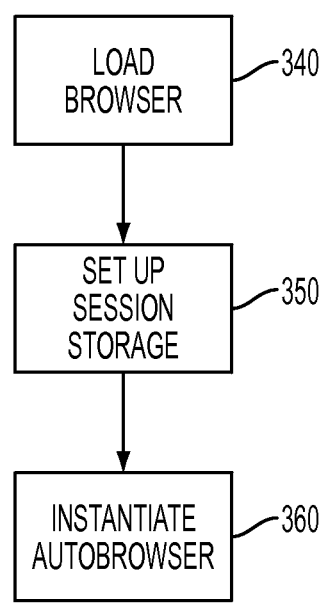
FIG. 3B is a flowchart illustrating an example embodiment of instantiation of a script-driven browsing application.
Figure 4:
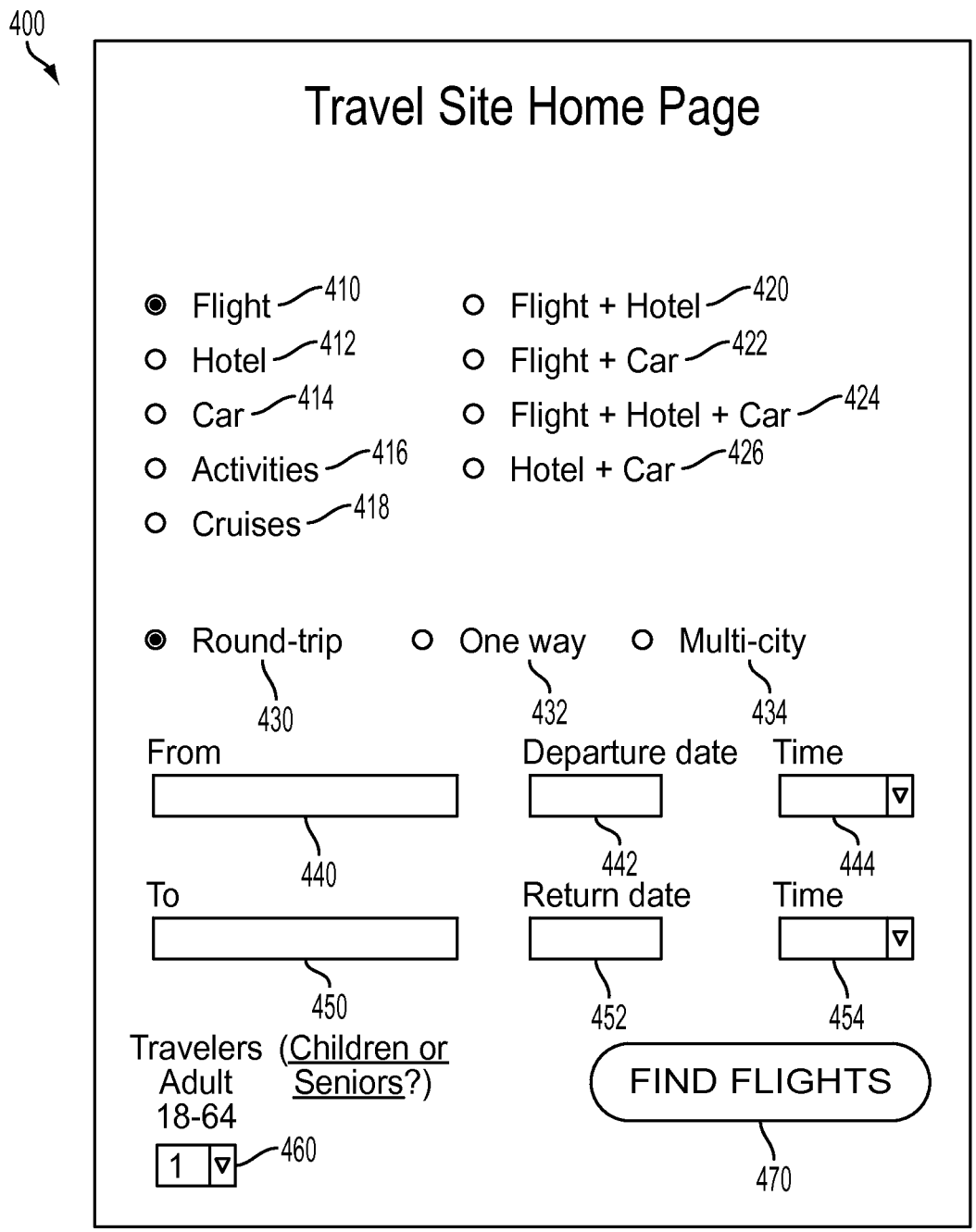
FIG. 4 is an example web page with search functionality that helps illustrate an embodiment.
Figure 5:
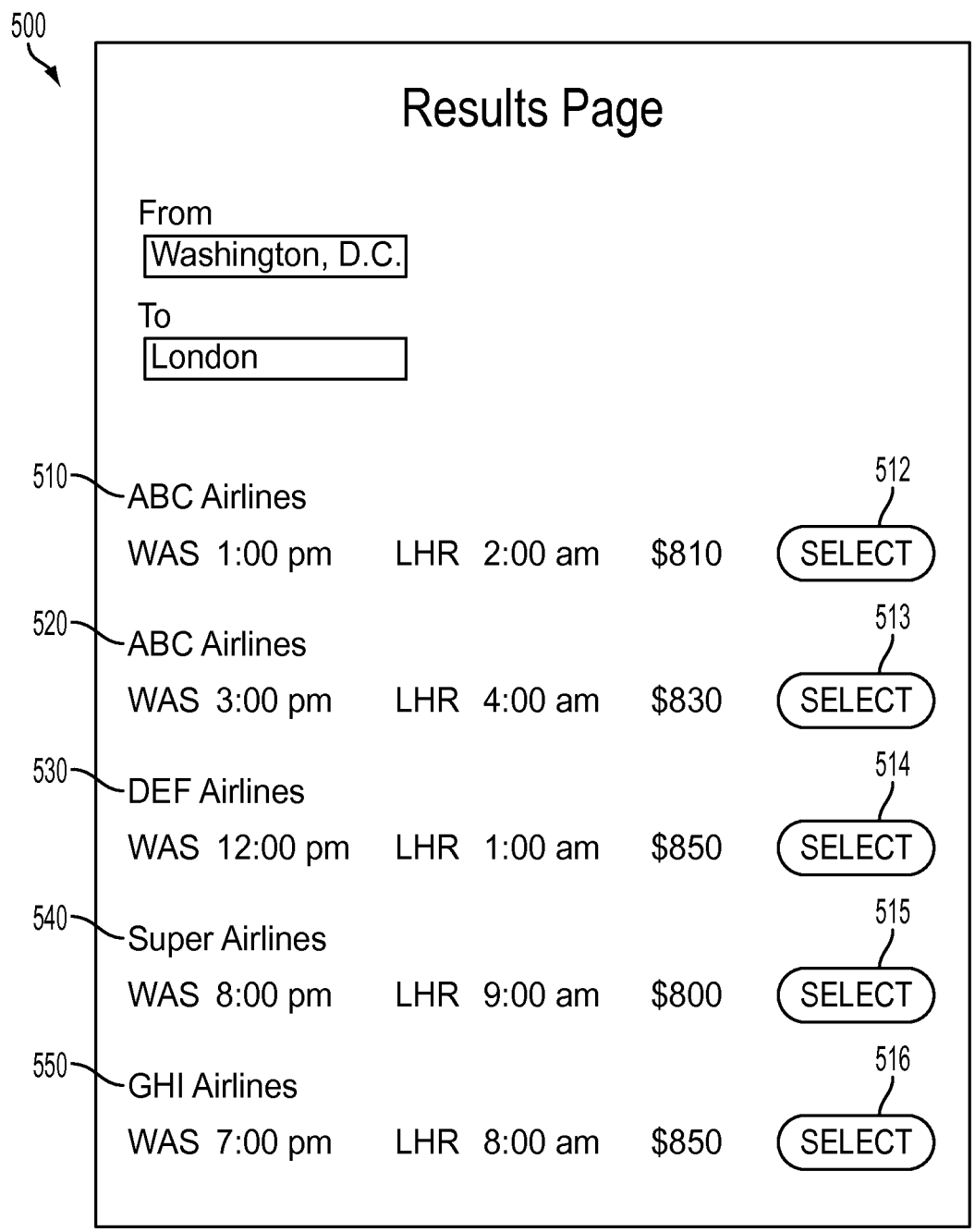
FIG. 5 is an additional example web page illustrative of search results.

As shown in FIG. 3B, example steps to begin a session to accomplish this include loading the browser 340, setting up session storage 350, and creating an instance of an autobrowser 360.

The script-driven browsing application will input the URL of a travel website. Once the home page 400 is loaded, the site may offer various travel options such as flight 410, hotel 412, car 414, activities 416, or cruises 418; or a combination thereof, such as flight and hotel 420, flight and car 422, flight, hotel and car 424, or hotel and car 426. The script-driven browsing application selects the desired criteria. For example, the script-driven browsing application will select the radio box for Flight 410, then select the radio box for Round-trip 430. Alternatively, the radio box for a one-way 432 or a multi-city 434 trip could be selected. The script-driven browsing application would then input the departure location 440 ("From"), the departure date 442, and departure time 444. The script-driven browsing application also inputs the destination location 450, return date 452, and return time 454. The script-driven browsing application also selects the number of travelers from pull down menu 460. Then, the script-driven browsing application clicks the Find Flights button 470.

This information is transmitted to the server 150, which processes the information. Subsequently, in return, server 150 transmits a Results Page 500 to client 110 in which the script-driven browsing application has been instantiated. (It will be remembered that similar functionality to client 110 exists at mobile device 120, laptop 130, or another client, and thus, these may be used as well.)

Results Page 500 contains one or more flights that may meet the user's parameters. For example, there may be five flights 510, 520, 530, 540, 550 meeting the desired criteria. The first flight 510 on the results page is ABC Airlines, departing Washington, D.C. at 1 pm and arriving at London Heathrow at 2 am, costing $810. (For simplicity, the return flights are not here shown.)

In this case, each of the Select buttons 512, 513, 514, 515, 516 may be DOM elements or nodes. An XPath expression can be used to identify the Select buttons 512, 513, 514, 515, and 516.

Here, the script-driven browsing application has obtained five search results. Using one or more XPath expressions, the script-driven browsing application is able to navigate the DOM and target the data associated with the Select buttons. In this way, the script-driven browsing application is capable of visiting multiple web pages within one session easily to retrieve detailed information about items listed on the first page.

To navigate through and retrieve the sometimes complicated information to be found on web pages, and especially where the navigation path traverses multiple web pages, use of a contextual loop 600 enhances the effectiveness of script-driven browsing application sessions. A non-limiting example embodiment of the use and flow of one or more loops in this manner will be provided.

Returning to the example embodiment, the script-driven browsing application is now able to continue its "crawl' to obtain detailed information about flight 510 on the results page—ABC Airlines, departing Washington, D.C. at 1 pm and arriving at London Heathrow at 2 am, costing $810.

Figure 6:
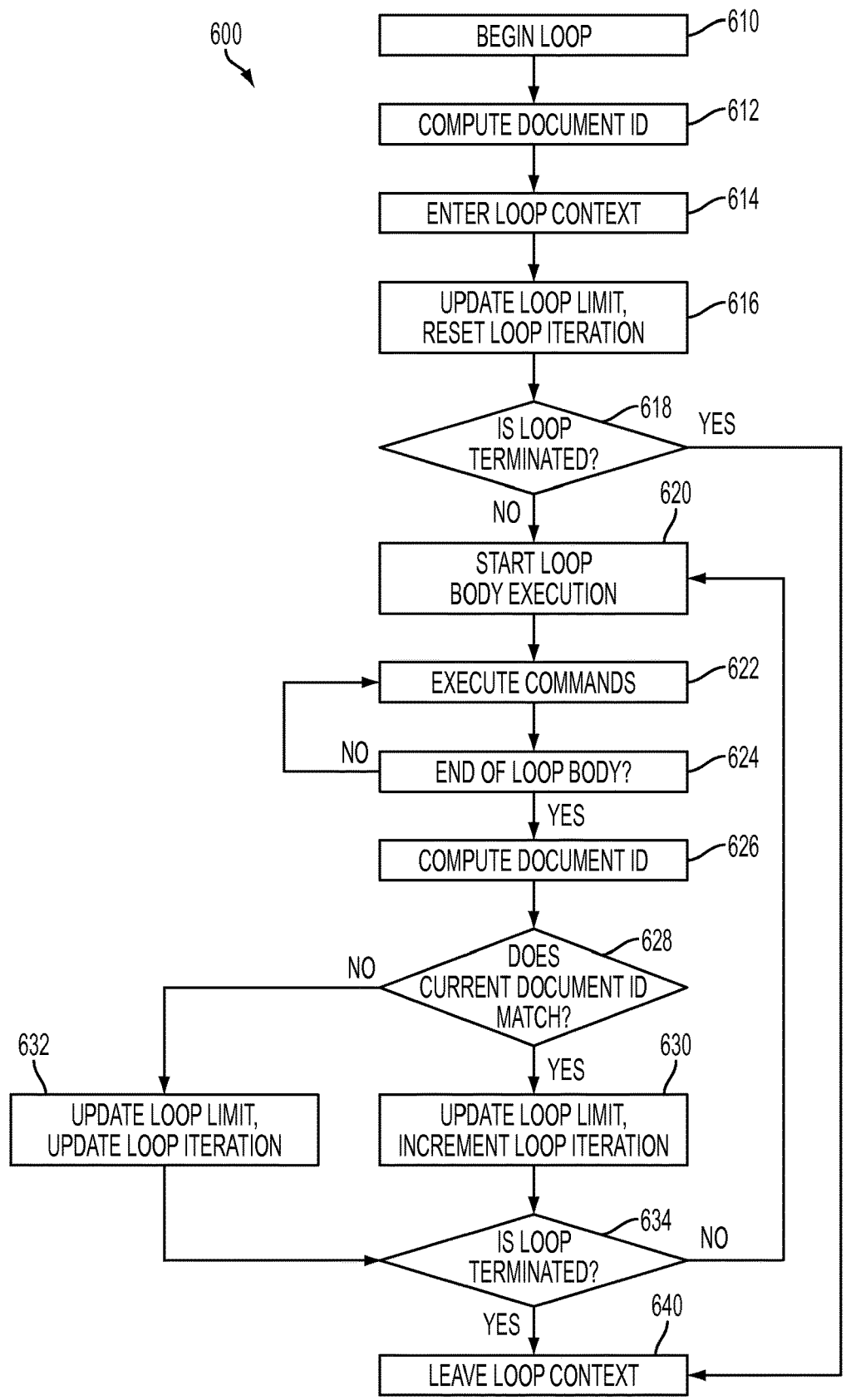
FIG. 6 is a flowchart for processing paired and impaired contextual loops in accord with an example embodiment.

Once Results Page 500 is loaded, a contextual loop 600 may be entered 610 as shown in FIG. 6. The document ID number is computed 612. Here the document ID is number 2. (Travel Site Home Page 400 is assumed to have document ID number 1.) Next, the loop context 614 is entered to keep track of several variables: loop limit, loop iteration number, and current context node. At 616, these variables are given their initial values. Loop limit is initially set to the amount of results on results page 500. Thus, loop limit is initially equal to 5. (By convention, enumeration in the context of computer memory may start at 0 for the first value. Thus, it will be understood that a further way of handling the loop limit is to set it to 4, i.e., comprising the five results enumerated 0, 1, 2, 3, 4.)

Also at 616, the loop iteration value is initially set to 0. This value will be incremented each time at step 630 in the flow (i.e., once the loop body end has been reached).

Also at 616, the current context node is referenced and stored in memory. Here the current context node corresponds to Select button 512.

Then, at 618 the script-driven browsing application determines whether the loop is terminated (i.e., it has looped five times corresponding to the five results). If yes, control proceeds to 640 where loop context is left.

Figure 7:
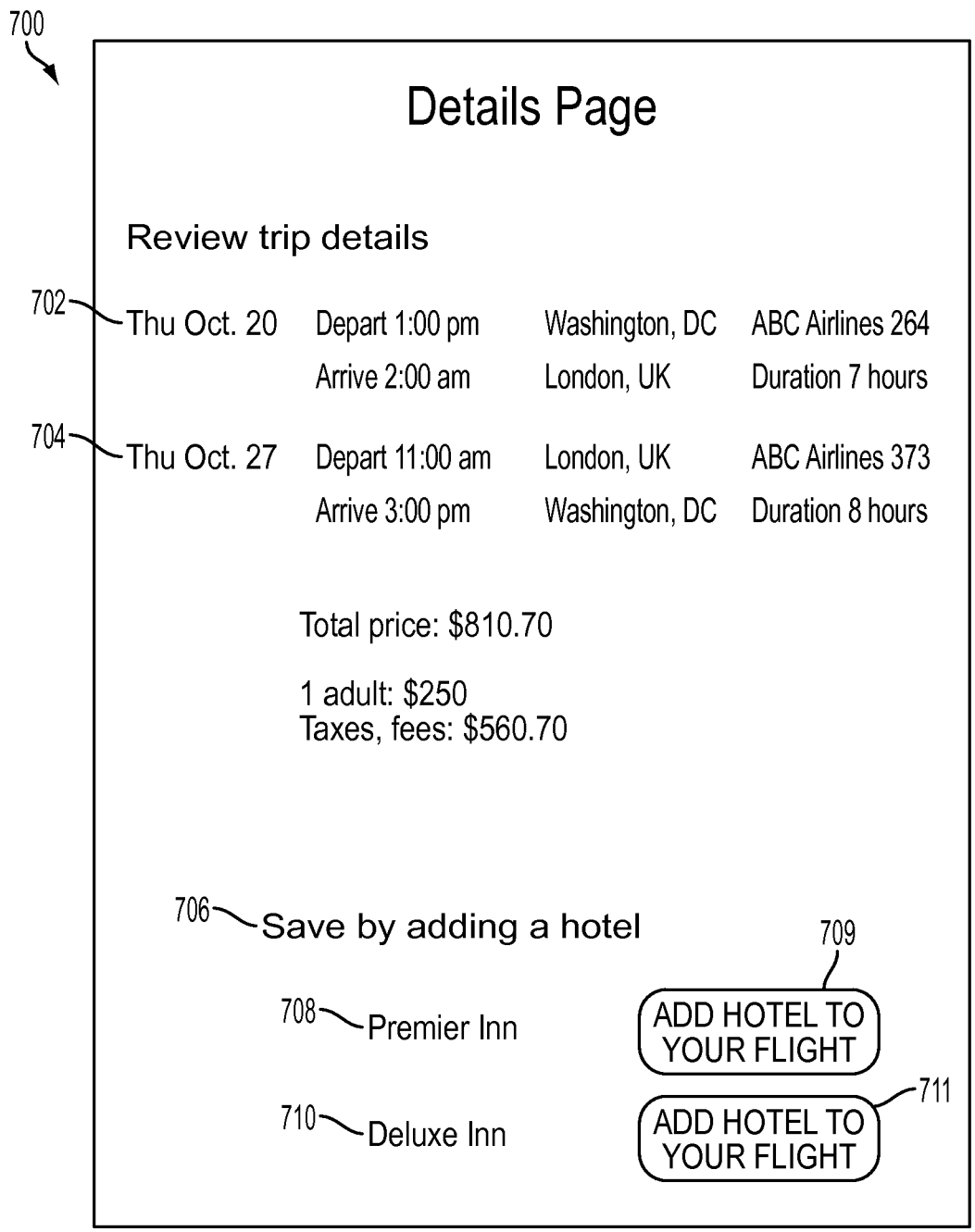
FIG. 7 is another example web page illustrative of search results.

If the script-driven browsing application determines that the loop has not terminated, then loop body execution is commenced 620. The loop body is comprised of script commands, and can perform desired operations. In the example scenario at hand, as illustrated in FIG. 7, the loop body uses script commands to perform access to Details Page 700. Details Page 700 is accessed via reference to the context node (currently Select button 512) as updated accordingly, and information is extracted from Details Page 700 operating on the DOM. Information that is extractable from the example of Details Page 700 include outgoing flight 702, return flight 704, ancillary add-on 706, ancillary add-on option one 708, and ancillary add-on option two 710.

However, the script-driven browsing application is communicating with a (presumably remote) server. There may be latency between the script-driven browsing application's sending and receiving information due to web congestion, server delay, etc. Thus, an advantageous approach is to implement transparent continuations 800.

In concept, it may be beneficial that no script execution should occur when networking activity occurs, and no networking activity should occur when script is executed.

In practice, to implement this functionality within the script-driven browsing application, we may implement an operation that detects when networking activity starts and networking activity ends. Informing the script interpreter of these events allows it to implement transparent continuations.

Figure 8:
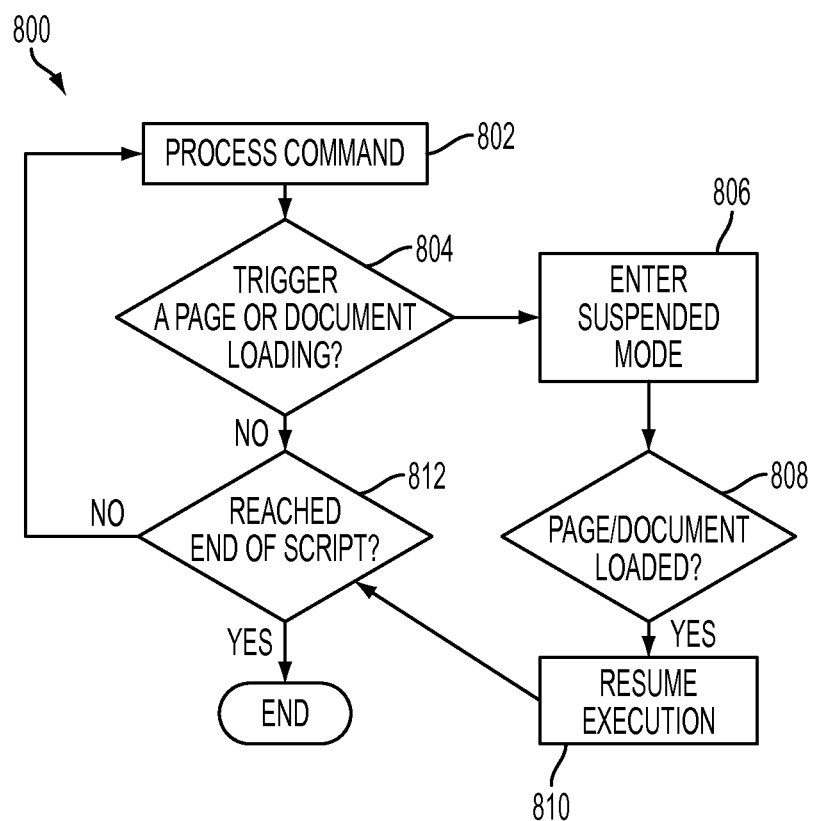
FIG. 8 is a flowchart for processing transparent continuations in accord with an example embodiment.

Thus, as seen in FIG. 8, if a page is loading—e.g., if Details Page 700 is loading—then operation is suspended until it is loaded. This may be accomplished in a non-limiting example embodiment by the following. The command is processed 802. Then, it is determined whether the command triggers a page or document loading 804. If yes, then the script interpreter enters a suspended mode 806. Monitoring continues 808, where it is checked whether the document or page loads. When the document or page successfully loads, then script execution resumes 810. A determination is then made as to whether the end of the script has been reached 812. If not, the transparent continuation is repeated with the command being processed 800. If the end of the script has been reached, the transparent continuation ends.

Assume now that Details Page 700 is loaded by the script-driven browsing application automatically clicking on Select button 512, after transparent continuation in the script command execution flow to account for networking activities occurs with reference to FIG. 8. Now, more commands may be executed 622. These commands extract detailed information from the document until no more desired information on the given flight 512 is available from Details Page 700. It is checked 624 whether the end of the block is reached. If the end of the loop body is not reached, then control loops back and commands continue to execute 622. A back command, put at the end of the loop body, may transfer control to Results Page 500.

At this point, in an example embodiment, the script-driven browsing application computes the Document ID 626. Assuming that the number so computed reflects that control is currently on Document 2, then it is determined whether Document ID 612 and Document ID 628 match. If yes, then loop state is updated 630.

In other words, control has returned to Document ID=2 in preparation for iterating through further flight results 513, 514, 515, and 516. Thus, the loop limit value remains at 5, the loop iteration value is set to 1 (reflecting the iteration through the details of flight results 512), and the loop context node is updated with the next Select button DOM element 513.

It may be checked whether the loop is terminated 634 (i.e., the loop limit is reached, that is, the number of iterations—here 1—equals the number of flight results—here 5). If, as here, there are five flight results, and there has been one iteration only, four more iterations need to take place.

Accordingly, in an example embodiment, the operations explained in detail above for Select button 512, which provides details on flight 510, may be carried out by clicking Select button 513 to obtain details on flight 520. Flight 520 is the second of five results. The above operations may be carried out for flights 530, 540 and 550 as well (the third, fourth and fifth results), via the corresponding Select buttons 514, 515, 516.

Once the loop iteration value equals the loop limit value—i.e., all results have been iterated through—then loop context is left 640. If, however, the loop iteration value does not equal the loop limit value, then control returns to recommence loop body execution 620.

It should be noted that in the second iteration, details of the second flight 520 may be obtained. The details page for flight 520 will be different from the details page for flight 510. However, the document ID of both the details pages may be the same, i.e., 3.

To this point, paired loop navigation has been discussed. In other words, the document IDs match after script-driven navigation occurs over one or more pages' elements (selected by the XPath expression) and the document IDs are computed. In other words, control has returned to the same document at which loop execution has begun 610, here the Results page 600, after data extraction on the Detail Page 700.

Figure 9:
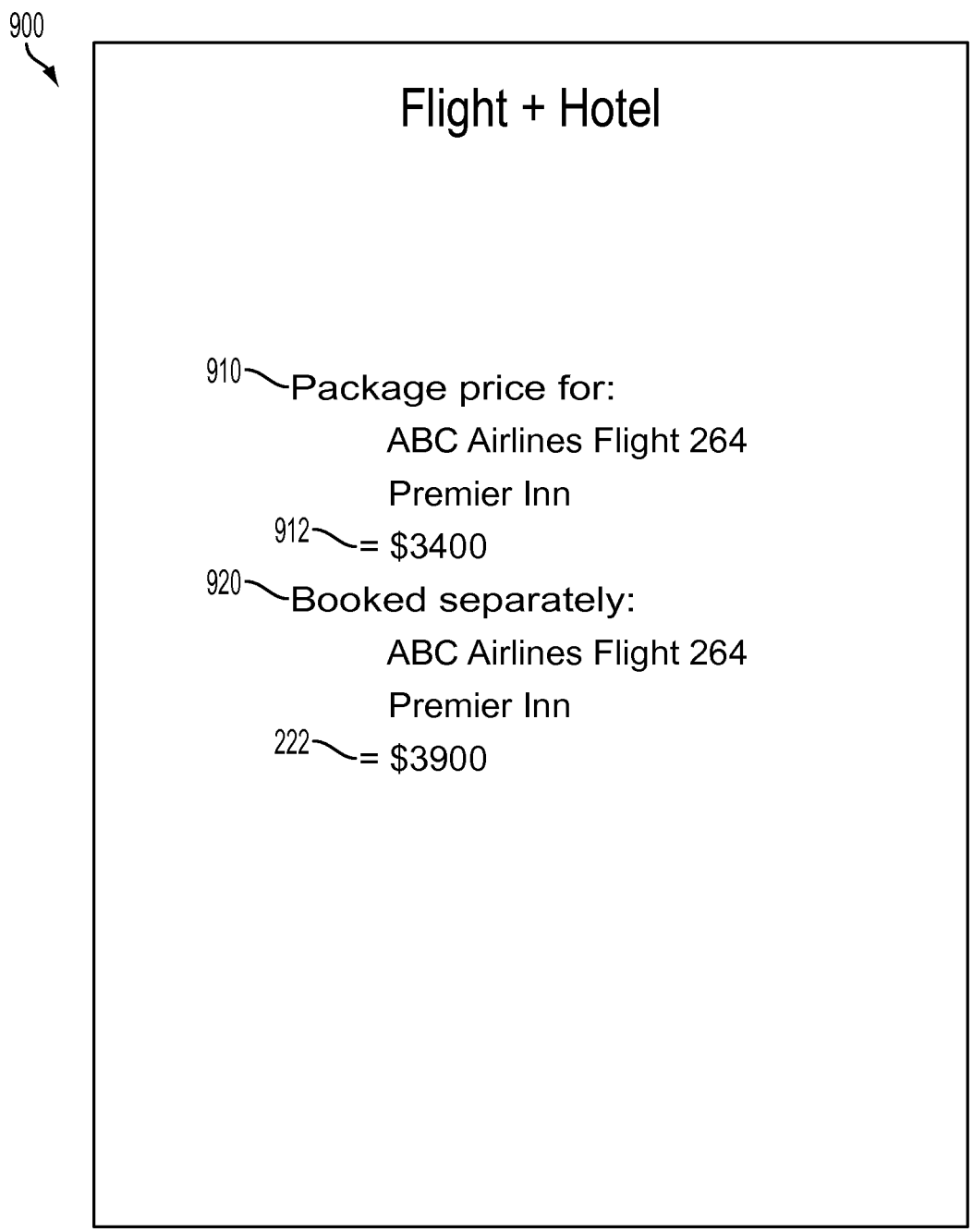
FIG. 9 is a still further example web page illustrative of search results.

However, it may be the case that the Document IDs do not match. This may be called impaired loop navigation. For example, control may run from Results Page 600 to Details Page 700 to yet another page 900 for the package of flight 510 plus hotel 708. This is because navigation may have proceeded to the Flight+Hotel page 900 at FIG. 9 via "Add hotel to your flight" button 709, or alternatively, "Add hotel to your flight" button 711, which is understood to be a DOM element. Here, a travel package 910 with a package price 912 may be provided that is a discount from what would be paid for a booking of the flight plus hotel separately 920 with a separate booking price 222.

The document ID of Flight+Hotel Page 900 may be Document ID=4, and the document ID of Details Page 700 may be Document ID=3. Thus, assume that it occurs that the evaluation at 612 shows that the value of the Document ID is 2, and the evaluation at 628 shows that the value of the Document ID is 3. The Document IDs do not match.

In the case of impaired loop navigation, the script-driven browsing application does not increment loop iteration because it would re-execute the loop body on a different document. Accordingly, in this case, an example embodiment flow goes to 632, and the script-driven browsing application starts again from the first element found in the current document. A new loop is commenced which the script-driven browsing application keeps tracks of separately. It is processed and one or more conditions may be checked. If, after navigation continues, the specified condition meets a certain value—i.e., document IDs match—then control returns to 634 of the original loop. If the specified condition is not met, yet another loop is created and processed.

A rationale behind the impaired navigation mechanism is to provide a way to navigate across an undetermined number of pages until a condition is met by using a single loop.

In an example embodiment, the following operations may take place for search results that appear on three web pages. In other words, a search on www.samplesearchengine.com may yield three results pages. Results on page 1 are iterated, and a "next page" element is activated. Results on page 2 are iterated, and a "next page" element is activated. Results on page 3 are iterated.

1. Start searching samplesearchengine.com for specific keywords.
2. 1st result page loaded
3. process first page
4. execution continues
5. document id=2—612; enter loop—614;
6. update loop limit (1)—616
7. execution continues
8. start loop body execution 620
9. click on "next page" link—622
10. second page loaded 622
11. process second page 622
12. end of loop block 624—Yes
13. document id 2 (first result page)!=3 (second result page) 626, 628
14. reset loop iteration (0) 632
15. update loop limit (1) 632
16. execution continues
17. start loop body execution 620
18. click on "next page" link 622
19. third (last) page loaded 622
20. process third page 622
21. end of loop block 624—Yes
22. document id 3 (second result page)!=4 (third result page) 626+628
23. reset loop iteration (0) 632
24. update loop limit (0) 632
25. loop is terminated 634—Yes
26. leave loop context 640

An efficient way of managing uncertainty in scenarios is a loop that handles pages other than the current page (e.g., "next pages"). By way of non-limiting example, the following may be employed.

```
:locate_travelsite_position
    # Check whether any results have been returned
    on "//*[@id='navcnt']/table/tbody/tr[count(td) - 2 > 1]" do
        # Process first page
        call locate_result
        # While there is a next page
        on
"//*[@id='tnav']/tbody/tr/td[@class='b']/a[@id='pnnext']/span[2]
[contains(text( ), Next)]" do
            # Go to the next page...
            click "//*[@id='pnnext']"
            # ... and process it
            call locate_result
        done
    case none do
        # There is no next page (single page response)
        done
```

Iteration may be performed on a "next page" link found on a next page. When no more "next page" exists, navigation may be completed.

Loop iteration over a set of elements with XPath will now be further explained. XPath evaluation provides a mechanism to evaluate an expression from a context node. Assume the script-driven browsing application wishes to iterate over each of the links (<a> elements) in a DOM representation of a User Reference for a given software application.

In an example embodiment, a loop is declared based on the

//a[contains(@href,'edit')] XPath expression. This expression allows the selection of all the <a> elements which allow the editing of a section of a web page (wiki page). A script instruction may contain the following:

on //a[contains(@href,'edit')] do #<-loop declaration
[ . . . ]
done (It should be noted that comments are preceded by the symbol #.)

This loop will iterate over the "edit" section links found in the page. At every iteration this XPath expression will be reevaluated, returning the number of matching DOM nodes. Then, the node corresponding to the current iteration will be used as context node for the loop body. Assume for purposes of this example that there are 58 <edit> elements in the text.

To follow the current link, the script may contain the instructions:

on //a[contains(@href,'edit')] do #<-loop declaration
click self::a #<-we may be using the self XPath axis
[ . . . ]
done Here that gives:

//a[contains(@href,'edit')][current iteration]/self::a

Thus at first iteration the selected node will be:

//a[contains(@href,'edit')][1]/self::a

And at last iteration the selected node will be:

//a[contains(@href,'edit')] [58]/self::a

Navigation within a loop may also performed similarly. Example:

on //a[contains(@href,'edit')] do #<-loop declaration
click self::a #<-using the "self" XPath axis
[ . . . ]
back
done The fact that control returns (in terms of navigation history) to the page on which it started the loop allows iteration over the next link. But in the meantime the page corresponding to the current "edit section" link has been accessed, allowing the performance of a desired operation (i.e., modifying section, navigating to other pages, even iterating on specific items again).

An example of code that may execute a scenario in accordance with an embodiment of the invention is as follows:

```
[Version 2.0]
:crawl
    on //Availability do
        on msg[type[text( )=W']] do
            keep message text/text( )
            process
        done
    case none do
        done
    on recommendation[position( )<=10]do
        on global_price do
            keep total_amount descendant::amount_with_fees/text( )
            keep base_amount descendant::amount_without_tax/text( )
```

```
          keep currency descendant::currency/text( )
          done
        on segment[1] do
          on descendant::flight do
            keep direction 'O'
            keep company ancestor::segment[1]/descendant::carrier/text( )
            keep flight_number 'N/A'
            on descendant::location_out/descendant::airportIATA/text() do
              keep depart_location self::text()
              done
            case none do
              keep depart_location 'N/A'
              done
            on descendant::date_out do
              keep depart_date_time "concat(descendant::day/text( ),' ',
              descendant::time/text( ))"
              done
            on descendant::location_in/descendant::airportIATA/text( ) do
              keep arrival_location self::text( )
              done
            case none do
              keep arrival_location 'N/A'
              done
            on descendant::date_in do
              keep arrival_date_time "concat(descendant::day/text( ),' ',
              descendant::time/text( ))"
              done
            done
          done
        on segment[2] do
          on descendant::flight do
            keep direction 'I'
            keep company ancestor:: segment[1]/descendant::carrier/text( )
            keep flight_number 'N/A'
            on descendant::location_out/descendant::airportIATA/text( ) do
              keep depart_location self::text( )
              done
            case none do
              keep depart_location 'N/A'
              done
            on descendant::date_out do
              keep depart_date_time "concat(descendant::day/text( ),' ',
              descendant::time/text( ))"
              done
            on descendant::location_in/descendant::airportIATA/text( ) do
              keep arrival_location self::text( )
              done
            case none do
              keep arrival_location 'N/A'
              done
            on descendant::date_in do
              keep arrival_date_time "concat(descendant::day/text( ),' ',
              descendant::time/text( ))"
              done
            done
          done
        dump_requests
        process
        done
      case none do
        keep message "No flight available"
        process
        done
      done
    case none do
      done
  done
:main
  no_keys
#Configuration
cfg_output_unicode false
cfg_set_moz_pref browser.block.target_new_window true
cfg_set_moz_pref dom.disable_open_during_load true
cfg_set_moz_pref network.image.imageBehavior 2
cfg_set_moz_pref network.cookie.cookieBehavior 0
cfg_set_moz_pref signon.rememberSignons false
cfg_set_moz_pref wallet.captureForms false
cfg_set_moz_pref security.warn_entering_secure false
cfg_set_moz_pref security.warn_entering_weak false
cfg_set_moz_pref security.warn_leaving_secure false
cfg_set_moz_pref security.warn_submit_insecure false
cfg_set_moz_pref security.warn_viewing_mixed false
cfg_set_crawl_timeout 60000
  cfg_set_inactivity_timeout 60000
  cfg_set_crawl_timeout 90000
  start http:// [put IP address here]/travelsite?TRIP_TYPE=
  R&B_LOCATION_IN=[insertlocation]&E_LOCATION_IN=
  [insert location]&D_DATE=[put a date here]&&R_DATE=[put a date
  here]&TRAVELLER_TYPE_1=ADT&TRAVELLER_TYPE_2=
  ADT&CABIN=E&SHOPBOT=TRUE
  call crawl
  #Lowcost search
  start http:// [put IP address here]/travelsite?TRIP_TYPE=
  R&B_LOCATION_IN=[insert
  location]&E_LOCATION_IN=[insert location]&D_DATE=
  [put a date here]&&R_DATE=[put a date
  here]&TRAVELLER_TYPE_1=ADT&TRAVELLER_TYPE_2=
  ADT&CABIN=E&SHOPBOT=TRUE&ONLY_LOWCOST=TRUE
  call crawl
  die status 'COMPLETED'
  done
```

The features and advantages described in the specification are not all inclusive and, in particular, many additional features and advantages will be apparent to one of ordinary skill in the art in view of the drawings, specification, and claims. The language used in the specification has been principally selected for readability and instructional purposes, and may not have been selected to delineate or circumscribe the disclosed subject matter.

The figures and the following description relate to example embodiments of the invention by way of illustration only. Alternative example embodiments of the structures and methods disclosed here may be employed without departing from the principles of what is claimed.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment. Reference to embodiments is intended to disclose examples, rather than limit the claimed invention.

Some portions of the above may be presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of actions (instructions) leading to a desired result. The actions are those requiring physical manipulations of physical quantities.

Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "browsing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method actions. The required structure for a variety of these systems will appear from the above description. In addition, the present invention is not described with reference to any particular programming language. It will be appreciated that a variety of programming languages may be used to implement the teachings of the present invention as described herein.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A computer-implemented system for automating a browser, the system comprising:
   a processor and an operatively-associated memory that stores a script and an argument, wherein the processor executes a routine defined by the script comprising:
   initiating a browsing session with a website;
   identifying, by using an expression, a parent node within a hierarchical structure representative of at least a portion of the website, wherein the parent node corresponds to an actuatable search element on a graphical user interface;
   executing a first operation in association with the parent node, wherein an operand of the first operation is the argument;
   identifying, as a result of the first operation, a first child node and a second child node, both the first child node and the second child node on a first web page of a website;
   assigning a first context identifier for the first child node;
   assigning a second context identifier for the second child node
   designating the first child node as a context node from which a loop can be entered;
   determining a first document identifier for the first web page;
   determining a second document identifier for a second web page, wherein the second web page has a descendant node that is a child of the first child node;
   executing a loop operation originating from the first context node, the loop operation extracting information from at least one node on the second web page;
   computing a current document identifier during the course of the loop operation; and
   in response to determining that the loop operation extracting information from the at least one node on the second web page has ended and to determining that the first document identifier and the second document identifier match, returning control to the first context node and identifying a second context node on the first web page corresponding to a second actuatable search element, wherein the quantity of loops of the loop operation is based on the quantity of linkable elements on the first web page.

2. The computer-implemented system of claim 1, wherein the first operation in association with the parent node comprises loading one or more associated web pages that result from passing the argument to the website.

* * * * *